United States Patent [19]
Johnsen

[11] 3,747,874
[45] July 24, 1973

[54] EJECTOR NOZZLE HAVING PRIMARY NOZZLES COMMUNICATING WITH EXHAUST GASES IN PLENUM CHAMBER

[75] Inventor: Raymond K. Johnsen, La Jolla, Calif.

[73] Assignee: Rohr Corporation, Chula Vista, Calif.

[22] Filed: Aug. 25, 1971

[21] Appl. No.: 174,670

[52] U.S. Cl. .............................. 244/53, 239/265.17
[51] Int. Cl. ............................................... F02k 1/02
[58] Field of Search ................................. 244/53 R; 239/265.17, 267; 60/90, 96.5, 270 R, 270 S, 281, 316, 317, 319; 115/18

[56] References Cited
UNITED STATES PATENTS
2,412,825   12/1946   McCollum ........................... 115/18

Primary Examiner—Milton Buchler
Assistant Examiner—S. D. Basinger
Attorney—George E. Pearson

[57] ABSTRACT

A jet engine aircraft propulsion mechanism has a plurality of primary nozzles mounted to receive engine exhaust gases from a plenum, and to discharge these gases at high velocity rearwardly into and through an ejector nozzle. Ejector pumping action generated by the flow of the exhaust gases rearwardly through the ejector nozzle draws ambient air into and rearwardly through the ejector nozzle along with the exhaust gases, thereby adding the mass of such air to that of the exhaust gases to increase thrust, provide cooling and reduce noise.

11 Claims, 6 Drawing Figures

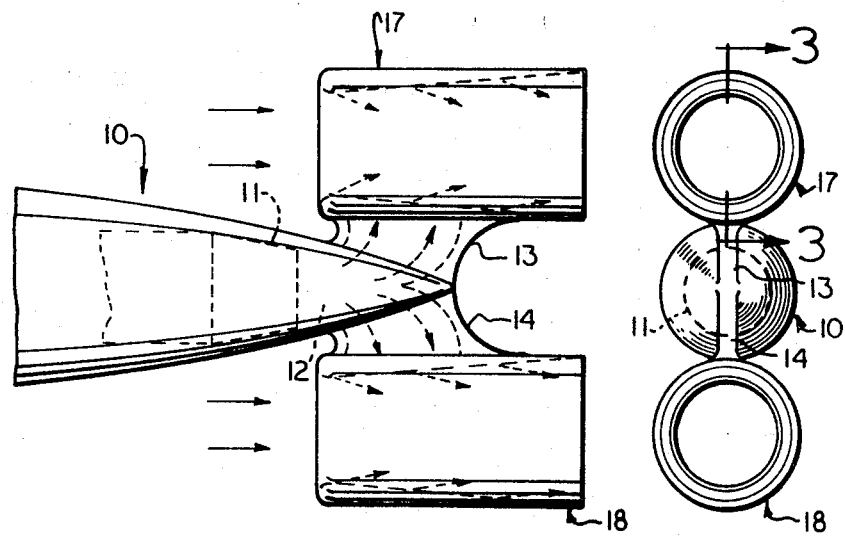
FIG. 1
FIG. 2
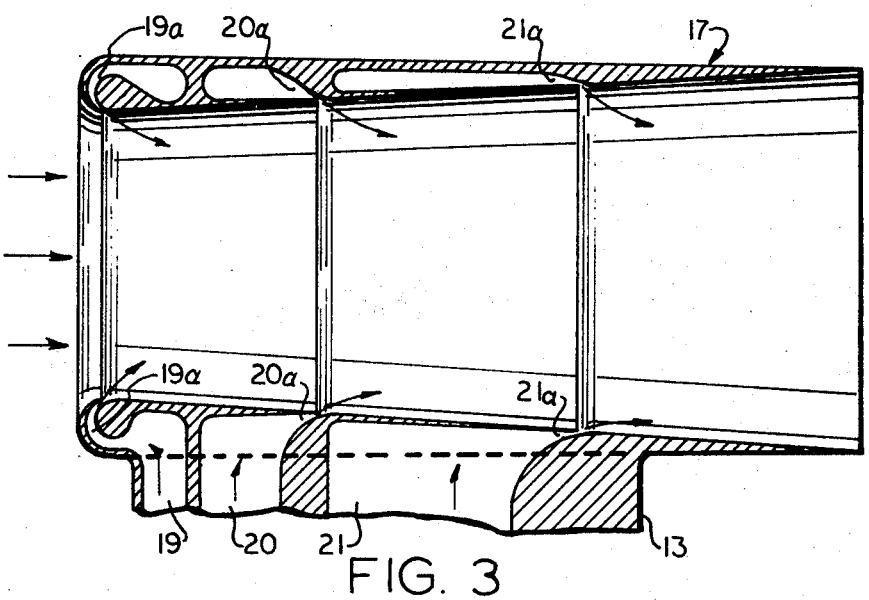
FIG. 3
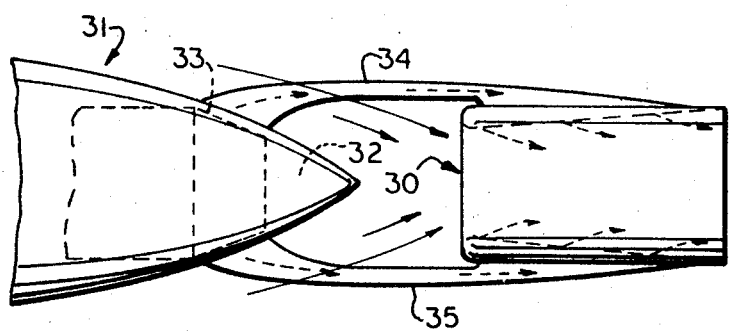
FIG. 4
INVENTOR.
RAYMOND K. JOHNSEN

INVENTOR.
RAYMOND K. JOHNSEN

BY

ATTORNEY

EJECTOR NOZZLE HAVING PRIMARY NOZZLES COMMUNICATING WITH EXHAUST GASES IN PLENUM CHAMBER

BACKGROUND OF THE INVENTION

It is common practice to employ ejectors on jet engine propelled aircraft. However, in prior use of such ejectors it has been customary to deploy the ejector co-axially of, and spaced rearwardly slightly from the engine, and to discharge the jet exhaust stream from the engine from the aft end of the nacelle and axially through the ejector, thereby increasing total thrust, cooling the exhaust gases, and suppressing some of the noise generated by the exhaust discharge.

SUMMARY OF THE INVENTION

In the present invention at least a substantial portion of the exhaust gases from an aircraft jet engine are discharged into a plenum chamber, and thence, through one or more ducts to each of one or more primary nozzles located in the ejector nozzle and directed to discharge these exhaust gases in the form of high velocity jet streams into and rearwardly through an ejector nozzle mounted on the aircraft. The ejector pumping action generated by the flow of these jet streams draws ambient air rearwardly through the ejector nozzle.

The term "nacelle" as used herein is intended to include an aircraft wing or fuselage in the event that the design of an aircraft should require the plenum chamber to be in such alternate location.

A primary objective of the invention is to provide a propulsion system for an aircraft having a jet propulsion engine mounted therein wherein exhaust gases from the engine are discharged into a plenum chamber, and are ducted thence to at least one primary nozzle located in an ejector and directed to discharge the exhaust gases in the form of one or more high velocity jet streams into and rearwardly through the ejector nozzle.

BRIEF DESCRIPTION OF THE INVENTION

The foregoing objectives and advantages of the invention will be apparent from the following description and the accompanying drawings, wherein:

FIG. 1 is a framgentary plan view of the aft end portion of an airplane jet engine nacelle having a double ejector nozzle embodying the invention mounted thereon, gas flow direction being indicated by arrows.

FIG. 2 is a rear end view of the ejector nozzle structure of FIG. 1.

FIG. 3 is an enlarged, fragmentary, sectional view taken along line 3—3 of FIG. 2.

FIG. 4 is a top, plan view taken generally similar to FIG. 1, but showing a single ejector nozzle mounted co-axially of, and spaced rearwardly from the nacelle.

DETAILED DESCRIPTION OF THE DRAWINGS

Figure 5:
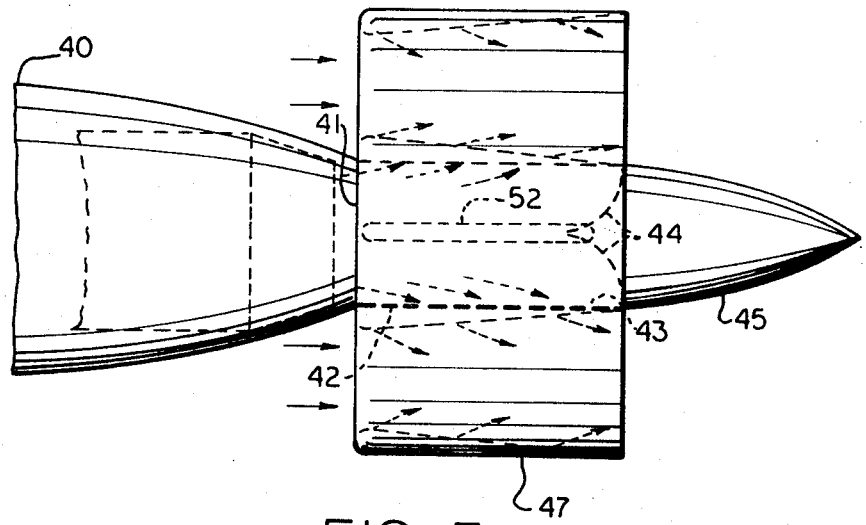
FIG. 5 is a plan view generally similar to FIGS. 1 and 4, but showing a multiple-ejector nozzle.

Referring to the drawings in detail, and considering first the form of the invention shown in FIGS. 1 – 3, a jet aircraft engine nacelle 10 has a usual jet engine, not shown, mounted co-axially therein, the usual turbine discharge nozzle 11 of such engine being shown in broken lines in FIG. 1. The type of jet engine employed is not material to the invention, and can be either a straight turbine, fan-jet or other type. The term "engine exhaust gases" as used herein is intended to include fan air when present as well as the turbine gases.

The aft end of the nacelle 10 is enclosed to form a plenum chamber 12 for the engine exhaust gases, with two struts 13 and 14 extending laterally and in opposite directions from the aft portion of the nacelle. Each of the struts 13 and 14 has an ejector nozzle, 17 and 18 respectively, mounted on the outer end thereof, the interior diameter of each of these ejector nozzles increasing rearwardly. Since both ejector nozzles 17 and 18 are similar, but reversed, only the ejector nozzle 17 is shown in detail in FIG. 2. Each of the struts 13 and 14 has three ducts 19, 20 and 21 therein which openly communicate the plenum chamber 12 with, respectively, three rearwardly directed primary nozzles 19a, 20a and 21a, best shown in FIG. 3. The three primary nozzles 19a, 20a and 21a are located and arranged to discharge engine exhaust gases from the plenum chamber 12, in the form of high velocity jet streams, indicated by arrows in FIG. 3, rearwardly into, and thence through the aft end of the ejector nozzle 17. Each of the ducts 19, 20 and 21 extend entirely around the ejector nozzle 17, as do also the primary nozzles opening from these ducts, the primary nozzle outlets being in the form of annular slots.

These primary nozzles 19a, 20a and 21a are to be developed by tests and calculations in accordance with well known principles of aircraft engineering and design to provide optimum size and shape for the performance requirements and other design factors of each type of installation in which the invention is to be embodied. As yet insufficient testing has been done to determine such optimum design requirements.

OPERATION OF THE EMBODIMENT OF FIGS. 1 – 3

In the form of the invention shown in FIGS. 1 – 3, exhaust gases are discharged by the engine mounted in the nacelle 10 and pass through the plenum 12, the ducts 19, 20 and 21 and are discharged through the primary nozzles 19a, 20a and 21a in the form of high velocity jet streams rearwardly into and out through the aft ends of the ejector nozzles 17 and 18.

The rearwardly flow of these gases through the ejector nozzle 17 and 18 produces a forward reaction thrust in accordance with well known principles, while at the same time the pumping action generated by the rearward flow of the exhaust gases through the ejector nozzles draws ambient air into the forward ends of the ejectors in accordance with well known ejector principles. The mass of such air is added to the total mass of gases discharged rearwardly from each ejector nozzle, thereby cooling the exhaust gases, exerting a sound suppressive effect, and adding to the total thrust.

MODIFICATION OF FIG. 4

In the modified form of the invention shown in FIG. 4, a single ejector nozzle 30, which may be generally similar in its primary nozzle structure to that 17 shown in FIG. 3, is mounted co-axially and in rearwardly spaced relation to an engine nacelle 31, which has a plenum chamber 32 therein aft of an engine nozzle 33 generally similar to the arrangement shown in FIG. 1. Since the nacelle 31 and ejector nozzle 30 shown in FIG. 4 are generally similar to those shown in FIGS. 1 – 3, the inner details thereof are omitted.

The structure shown in FIG. 4 differs from that of the preceding views primarily in that two similar, but reversed, hollow stangs 34 and 35 support the ejector 30 in rearwardly spaced, co-axial relation to the nacelle, and provide ducts which communicate the plenum chamber 32 with the primary ejector nozzles, not shown, similarly to the ducts 19, 20 and 21 of FIG. 3. The operation of the modified structure of FIG. 4 is generally similar to that described previously herein in FIGS. 1 – 3, and will be apparent to one having an understanding of such previously described structure. Its description is therefore omitted.

Figure 6:
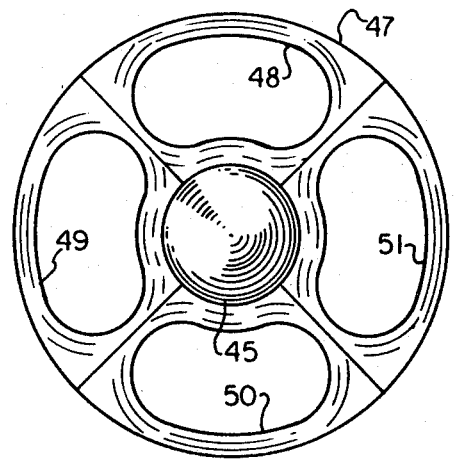
FIG. 6 is a rear end view of FIG. 5.

MODIFICATION OF FIGS. 5 and 6

In the further modified form of the invention shown in FIGS. 5 and 6, the aft end of an aircraft engine nacelle 40 is truncated on a plane defined by the line 41, and a cylindrical extension thereof, indicated in broken lines 42 in FIG. 5 and open at its forward end, provides a plenum chamber 43 for the engine exhaust gases. The aft end of the plenum chamber 43 is closed by a conical baffle 44, see FIG. 5, and a conventional tail cone 45 is provided for streamlining.

A cylindrical enclosure 47 is provided co-axially around the cylindrical plenum chamber 43, and four similar ejector nozzle passages 48, 49, 50 and 51 are arranged symmetrically around, and axially parallel to, the plenum chamber 43. Each ejector nozzle passage is of kidney cross sectional shape, although the specific shape thereof is not a material feature of the invention.

Ducts 52 communicate the plenum chamber 43 with primary nozzles, not shown, but which may be similar to those 19, 20 and 21 shown in FIG. 3, for discharge of the engine gases in the form of a high velocity jet stream rearwardly into and through the ejector nozzle passages 48, 49, 50 and 51. The action of these high velocity jet streams, and the ejector pumping action produced thereby, is similar to that described for the preceding forms of the invention, and will be obvious to one having an understanding of such preceding forms.

The invention provides a jet propulsion mechanism for aircraft wherein jet streams are discharged from a plurality of primary nozzles rearwardly into and through an ejector, said primary nozzles being at least partially shielded from the ground by the ejector nozzle, thereby providing some sound suppression. The interior of each ejector nozzle preferably is lined with suitable acoustical lining material such as acoustical honeycomb panel for increased sound absorption. Additionally, the mass of ambient air pumped through each ejector nozzle embodying the invention exerts a cooling effect on the hot exhaust gases, adds to their mass, and reduces their velocity, the total effect of which is to add thrust and reduce noise emission.

Having thus described my invention, what I claim as new and useful and desire to secure by U. S. Letters Patent is:

1. In an aircraft having an engine nacelle and a jet engine mounted therein, propulsion mechanism for optimizing thrust and minimizing noise comprising, a plenum chamber in the nacelle to receive a continuous flow of pressurized exhaust gases from the engine, at least one ejector nozzle mounted on the aircraft with its axis in a fore-and-aft direction and its forward and aft ends open solely to the ambient atmosphere, at least one primary nozzle extending circumferentially of the ejector nozzle and directed to discharge rearwardly into the ejector nozzle through an annular slot provided in the inner surface thereof, and duct means openly communicating the plenum chamber in sealed relation with each primary nozzle for conducting all of the pressurized engine exhaust gases from the plenum chamber to and through said at least one primary nozzle and thence rearwardly along the interior surface of the ejector nozzle.

2. Aircraft propulsion mechanism as claimed in claim 1 wherein the plenum chamber is an enclosure surrounding the aft end of the engine from which the engine exhaust gases are discharged.

3. Aircraft propulsion mechanism as claimed in claim 2 wherein the plenum chamber comprises the aft end of the nacelle in which the engine is mounted, from which aft end the sole exit is the duct means.

4. Aircraft propulsion mechanism as claimed in claim 1 wherein said at least one ejector nozzle is mounted in transversely offset relation to the aft end portion of the nacelle.

5. Aircraft propulsion mechanism as claimed in claim 4 wherein a support strut supports the ejector nozzle from a closed, aft portion of the nacelle wherein the plenum chamber is provided, and the duct means extends through the interior of the strut.

6. Aircraft propulsion means as claimed in claim 4 wherein two ejector nozzles are mounted one on each side of the aft end of the nacelle in symmetrically spaced relation on opposite sides of the nacelle.

7. Aircraft propulsion means as claimed in claim 1 wherein at least one annular passage extends around the ejector nozzle and said annular passage is in open communication with said primary nozzle and with the duct means.

8. Aircraft propulsion mechanism as claimed in claim 3 wherein a single ejector nozzle is supported co-axially of, and in axially spaced relation aft of the closed aft end of the nacelle, support means for the ejector nozzle comprising a pair of hollow stangs mounted on opposite sides of the nacelle and the ejector nozzle, the duct means being provided interiorly of the hollow stangs.

9. Aircraft propulsion means as claimed in claim 1 wherein a single annular enclosure is mounted coaxially around the aft end of the nacelle and in radially spaced relation thereto, a plurality of ejector nozzles are mounted in symmetrically spaced relation within the space between the nacelle and the annular enclosure, means closing off such space with the exception of the ejector nozzles, the duct means comprising a duct communicating the plenum chamber with a primary nozzle in each ejector nozzle.

10. Aircraft propulsion means as claimed in claim 9 wherein the plenum chamber comprises a cylindrical extension of the aft end of the nacelle, and coaxially within the annular enclosure, and means closing the aft end of the cylindrical nacelle extension.

11. Aircraft propulsion means as claimed in claim 10 and a streamlined coaxial conical extension on the aft end of the cylindrical nacelle extension.

* * * * *